United States Patent
Krafcik et al.

(10) Patent No.: US 11,952,505 B1
(45) Date of Patent: *Apr. 9, 2024

(54) ONE COMPONENT SELF-CROSSLINKING COATINGS

(71) Applicant: SWIMC LLC, Cleveland, OH (US)

(72) Inventors: Randolph B. Krafcik, Cleveland, OH (US); Jose C. Aravena, Cleveland, OH (US); James E. Rinz, Cleveland, OH (US); Ruisong Xu, Cleveland, OH (US); Zhangqing Yu, Warrensville Hts, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,199

(22) Filed: Jan. 3, 2023

Related U.S. Application Data

(63) Continuation of application No. 16/996,693, filed on Aug. 18, 2020, now Pat. No. 11,572,489.

(60) Provisional application No. 62/892,742, filed on Aug. 28, 2019.

(51) Int. Cl.
| | |
|---|---|
| C09D 175/06 | (2006.01) |
| C08F 212/08 | (2006.01) |
| C08F 216/36 | (2006.01) |
| C08F 218/08 | (2006.01) |
| C08F 220/56 | (2006.01) |
| C08K 5/00 | (2006.01) |
| C08K 5/17 | (2006.01) |
| C08K 5/24 | (2006.01) |
| C09D 133/08 | (2006.01) |

(52) U.S. Cl.
CPC .......... *C09D 175/06* (2013.01); *C08F 212/08* (2013.01); *C08F 216/36* (2013.01); *C08F 218/08* (2013.01); *C08F 220/56* (2013.01); *C08K 5/0025* (2013.01); *C08K 5/17* (2013.01); *C08K 5/24* (2013.01); *C09D 133/08* (2013.01)

(58) Field of Classification Search
CPC .................................................... C08F 216/36
See application file for complete search history.

(56) References Cited

U.S. PATENT DOCUMENTS

| 4,983,662 | A | * | 1/1991 | Overbeek | ............ | C09D 175/04 |
| | | | | | | 524/840 |
| 2002/0103278 | A1 | * | 8/2002 | Krajnik | .............. | C09D 133/062 |
| | | | | | | 524/192 |

* cited by examiner

*Primary Examiner* — Wenwen Cai
(74) *Attorney, Agent, or Firm* — Honigman LLP

(57) ABSTRACT

A waterborne one-component coating composition capable of self-crosslinking and exhibiting a gloss and hardness improvement when cured that is similar to a solventborne two-component composition. The composition includes a urethane phase including a polyurethane polymer with at least polyester diol monomer units, polycarbonate diol monomer units, and ketone-functionalized diol monomer units. The composition may include an optional acrylic phase including an acrylic polymer having monomer units selected from one of alkyl (meth)acrylate monomer units, vinyl acetate monomer units, styrene monomer units, ketone-functional vinyl monomer units, or combinations thereof. The composition includes a hydrazine-functionalized crosslinking agent configured to crosslink one of the ketone-functionalized diol monomer units, the ketone-functional vinyl monomer units, or both. The composition further includes one or more tertiary amine reaction moderators or neutralizing agents.

16 Claims, No Drawings

ONE COMPONENT SELF-CROSSLINKING COATINGS

CROSS REFERENCE TO RELATED APPLICATION

This application is a continuation of U.S. patent application Ser. No. U.S. Ser. No. 16/996,693, filed Aug. 18, 2020, and claims the benefit of U.S. Provisional Application No. 62/892,742, filed on Aug. 28, 2019, each of which is incorporated herein by reference

FIELD

This application generally relates to one-component, self-crosslinking waterborne coatings, and in particular, one-component, self-crosslinking waterborne polyurethane coatings.

BACKGROUND

Solvent-based, two component polyurethane coatings typically exhibit high performance in many applications, such as exterior, metal, and/or industrial applications. These coatings often have a high ability to resist scratching, impacts, and/or abrasions and tend to provide good protection against environmental contaminates such as UV rays, rain, snow, and the like. In industrial settings, polyurethane coatings for metals, for example, can provide a high gloss finish and exceptional weathering performance even with only thin film applications. Overall, solvent-based, two component polyurethane coatings are well accepted in many applications to provide superior performance.

While these solvent-based, two component polyurethane coatings are well-accepted, they are often less desired for many reasons. For one, they include organic solvents and volatile organic compounds (VOCs), which are less preferred and becoming increasingly more regulated by various industries and environmental organizations. Two-component systems are more difficult to work with due to the multiple components and mixing needed for performance. As a result, the demand for water-based and one-component polyurethane products has increased.

While film performance of waterborne and one-component systems has improved over the years, it still cannot achieve the performance obtained from the traditional two-component and solvent-based polyurethane. Water-based systems normally do not attain the same degree of cross-linking as the prior two-component solvent systems and, thus, tend to have a lower crosslinking density and performance. Lower crosslink density affects the mechanical properties and the chemical resistance of the coatings. Waterborne coatings are also dependent on the evaporation of water to form a film, which is dependent upon ambient conditions and coating homogeneity. In the case of waterborne coatings, a uniform layer of coating generally needs to be maintained until the water and any organic co-solvents have evaporated to form the uniform film of insoluble organic polymer. Under ambient conditions, however, imperfections on the surface of the cured film can develop during film formation. Such imperfections are often damaging to the overall performance of the coating. These imperfections may be related, for example, to the variable and/or fast rate of crosslinking reactions taking place in the aqueous phase during film formation.

SUMMARY

In one aspect, a waterborne one-component coating composition capable of self-crosslinking and exhibiting a gloss and hardness improvement when cured that is similar to a solventborne two-component composition is described herein. In one approach, the composition includes a urethane phase including a polyurethane polymer with at least polyester diol monomer units, polycarbonate diol monomer units, and ketone-functionalized diol monomer units; an optional acrylic phase including an acrylic polymer having monomer units selected from one of alkyl (meth)acrylate monomer units, vinyl acetate monomer units, styrene monomer units, ketone-functional vinyl monomer units, or combinations thereof, the acrylic phase having a glass transition temperature of about 0° C. to about 100° C.; a hydrazine-functionalized crosslinking agent configured to crosslink one of the ketone-functionalized diol monomer units, the ketone-functional vinyl monomer units, or both; and one or more tertiary amine reaction moderators or neutralizing agents, wherein the tertiary amine reaction moderators have either an azeotrope temperature or boiling point above the azeotrope temperature of triethylamine and water (approximately 76° C.) or above the boiling point of triethylamine (approximately 88° C.), respectively.

The waterborne one-component coating composition of the previous paragraph may also include one or more optional feature in any combination. These optional features may include: wherein a weight ratio of the ketone-functionalized diol monomer units to the ketone-functional vinyl monomer units is about 1:1 to about 2:1; and/or wherein a weight ratio of the acrylic phase to the urethane phase is about 1:9 to about 9:1; and/or wherein the one or more tertiary amine reaction moderators is an alkoxydialkylamine; and/or wherein the one or more tertiary amine reaction moderators have an azeotrope temperature or boiling point of about 80 to about 135° C. and an active amine composition of about 20 to about 60 percent; and/or wherein the one or more tertiary amine reaction moderators are selected from the group consisting of dimethyl amino hydroxyl propane, dimethylamino-2-methyl-1-proponal, triethylamine, N—N-dimethyl-3-methoxypropylamine, dimethylaminoethanol and combinations thereof; and/or wherein the composition includes about 3 to about 8 percent of the ketone-functionalized diol monomer units; and/or wherein the ketone-functionalized diol monomer units in the urethane phase are ketone-functionalized dialkanol amidoamine monomer units; and/or wherein the ketone-functionalized diol monomer units in the urethane phase are obtained from the Michael reaction between a dialkanol amine and a ketone-functionalized vinyl amide; and/or wherein the ketone-functionalized diol monomer units are selected from diacetone acrylamide diols, silane-functional monomer units, fluoro-functional monomer units, and combinations thereof; and/or wherein the acrylic phase includes the alkyl (meth)acrylate monomer units derived from methyl (meth)acrylate, ethylhexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamantyl (meth)acrylate, or combinations thereof; and/or wherein the ketone-functional vinyl monomer units derived from diacetone acrylamide, diacetone (meth)acrylamide, acetoacetoxyethyl (meth)acrylate, acrolein, methacrolein, vinylacetoacetate, or combinations thereof; and/or wherein the acrylic phase includes an acrylic polymer having about 100 to about 94 percent of linear or branched alkyl (meth)acrylate monomer units and about 0 to about 6 percent of the ketone-functional vinyl monomer units; and/or wherein a weight ratio of the ketone-functionalized diol monomer units to the ketone-functional vinyl monomer units is about 1:1; and/or wherein the coating composition, when dried as a film, exhibits a Koenig hardness of about 30 to about 120; and/or wherein the coating composition, when dried as a film, exhibits a gloss of about 60 to about 90 measured at 85°; and/or wherein the coating composition, when dried as a film, exhibits a good chemical resistance according to ASTM D1308-02 (2013) ("Standard Test Method for Effect of Household Chemicals on Clear and Pigmented Organic Finishes") and as further described herein; and/or wherein the polyurethane polymer of the urethane phase includes a weight ratio of the polycarbonate diol monomer units to the polyester diol monomer units of about 3:1 to about 20:1.

In yet other aspect, the present disclosure also provides a method of delaying the onset of crosslinking in a waterborne one-component coating composition capable of self-crosslinking at room temperature or the use of certain tertiary amines for delaying the onset of crosslinking in such waterborne compositions. In some approaches, the method or use includes (a) applying a one-component coating composition to a substrate. The one-component coating composition may include a urethane phase including a polyurethane polymer with at least polyester diol monomer units, polycarbonate diol monomer units, and ketone-functionalized diol monomer units; an optional acrylic phase including an acrylic polymer having monomer units selected from one of alkyl (meth)acrylate monomer units, vinyl acetate monomer units, styrene monomer units, ketone-functional vinyl monomer units, or combinations thereof, the acrylic phase having a glass transition temperature of about 0° C. to about 100° C.; about 1 to 10 weight percent of the ketone-functionalized diol monomer units; a hydrazine-functionalized crosslinking agent configured to crosslink one of the ketone-functionalized diol monomer units, the ketone-functional vinyl monomer units, or both; and one or more tertiary amine reaction moderators having either an azeotrope temperature or boiling point above the azeotrope temperature of triethylamine and water (approximately 76° C.) or above the boiling point of triethylamine (approximately 88° C.), respectively. The method may then (b) evaporate the one or more tertiary amine reaction moderators from the applied coating composition at about 4° C. to 40° C., or more preferably 20° C. to about 25° C., to lower the pH thereof below about 7 to initiate imine bond formation between one of the ketone-functionalized diol monomer units, the ketone-functional vinyl monomer units, or both and the hydrazine-functionalized crosslinking agent.

The method of the previous paragraph may also include one or more optional features in any combination thereof. These optional features may include any of the features as described above for the waterborne composition in any combination within the described method or use.

DETAILED DESCRIPTION OF THE INVENTION

The present disclosure provides a one-component, waterborne, self-crosslinking polyurethane or polyurethane/acrylic hybrid polymer system that attains performance similar to or better than prior two-component, solvent based systems. The systems herein have a unique crosslink chemistry for a one-component, waterborne system to moderate the degree, rate, and timing of crosslinking.

In one aspect, the waterborne one-component coating composition are capable of self-crosslinking and exhibiting a gloss and hardness, when cured, that is similar to a solvent-based two-component system. In some approaches, the composition includes a urethane phase and, in some cases, a hybrid system with both a urethane phase and an acrylic phase. The urethane phase includes a polyurethane polymer with at least polyester diol monomer units, polycarbonate diol monomer units, and ketone-functionalized diol monomer units. If included, the acrylic phase has an acrylic polymer with monomer units selected from one or more of alkyl (meth)acrylate monomer units, vinyl acetate monomer units, styrene monomer units, ketone-functional vinyl monomer units, or combinations thereof. The systems further include a hydrazine-functionalized crosslinking agent configured to crosslink one of the ketone-functionalized diol monomer units, the ketone-functional vinyl monomer units, or both, and a reaction moderator in the form of one or more select tertiary amine reaction moderators having a boiling point, azeotrope temperature, and/or amine content thereof effective to help moderate the rate, timing, and amount of crosslinking.

As discussed more below, the unique selection of polymer components, amounts, and/or moderators tends to manage the crosslink reaction between the ketone-functionalized diol units and/or the ketone-functional vinyl units to not only form high crosslink density but attain good film formation at the same time in a waterborne system. Each of the components will be discussed in more detail below.

Urethane Phase

The urethane phase of the composition includes a polyurethane polymer having urethane groups (—O—C(O)—NH—) and can be produced by a variety of difference mechanisms. In one approach, this polymer includes at least polyol monomer units (polyester diol and/or polycarbonate diol monomer units) and ketone-functionalized diol monomer units reacted together with an isocyanate, diisocyante, or polyisocyanate. The polyurethane polymer may also include optional monomer units including, but not limited to, carbonate diol monomer units, chain extenders, water-dispersiblity monomers, and the like, and combinations thereof as needed for a particular application. Additional monomer groups may also include urea, allophanate, biuret, carbodiimide, oxazolidinyl, isocyanurate, uretdione, ether, ester, carbonate, and the like monomer units, and combinations thereof in addition to the urethane moieties. The polyurethane polymer is formed by reacting the various monomer units with the isocyanate, diisocyanate, or polyisocyanate.

Isocyanate, Diisocyanate, or Polyisocyanate: Suitable isocyanates in the urethane phase include those with at least two isocyanate groups (—NCO) and may include aliphatic, cycloaliphatic, and aromatic isocyanates. In one approach, diisocyanates may be used. Suitable aliphatic isocyanates include alkylene diisocyanates, such as hexamethylene-1,6-diisocyanate, 1,12-dodecane diisocyanate, trimethyl-hexamethylene diisocyanate, 2-methyl-1,5-pentamethylene diisocyanate, and the like, and combinations thereof. Suitable cycloaliphatic isocyanates include dicyclohexylmethane diisocyanate, isophorone diisocyanate, cyclohexane diisocyanate, bis-(isocyanatomethyl) cyclohexane, and the like, and combinations thereof. Suitable aromatic isocyanates include diphenyl methylene diisocyanate, toluene diisocyanate, naphthalene diisocyanate, and the like, and combinations thereof. The isocyanate is reacted with hydrogen-active compounds such as monomer units including polyols or polyamines. In one approach, the polyurethane includes about 35 to about 55 wt. %, 40 to 50 wt. %, or 42 to 46 wt. % of the isocyanate, diisocyanate, or polyisocyanate as described above by weight of the polyurethane phase.

Polyol: The polyurethane phase may also include one or more polyol monomer units. As used herein, a polyol monomer unit includes any molecule or monomer unit having two or more hydroxyl groups per molecule or monomer unit. In one approach, the polyols are diols. In other approaches, the diols are monomer units including at least polyester diols that have a plurality of ester groups or moieties (—C(O)O—) therein. Examples include but are not limited to poly(butanediol adipate), caprolactones, polyesters from hexane diol, adipic acid and isophthalic acid including hexane adipate isophthalate polyester, hexane diol neopentyl glycol adipic acid polyester diols, and the like. Typically, the polyester diol monomer units may be a reaction product of polycarboxylic acids or their anhydrides with a diol. In some approaches, the polyurethane includes about 0 to about 40 wt. %, 3 to 35 wt. %, 5 to 27 wt. %, or 8 to 12 wt. % of the polyester diol by weight of the polyurethane phase.

Suitable diols for preparing the polyester polyol monomer units herein may include alkylene diols, (such as, ethylene diol, propylene diol, butylene diol, hexane diols, neopentyl diol, 1,6-hexanediol, 1,8-octanediol) and other diols including bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, or combinations thereof.

Suitable carboxylic acids for preparing the polyester diol monomer units include dicarboxylic acids and tricarboxylic acids and anhydrides. Examples include maleic acid, maleic anhydride, succinic acid, glutaric acid, glutaric anhydride, adipic acid, suberic acid, pimelic acid, azelaic acid, sebacic acid, chlorendic acid, phthalic acid, phthalic anhydride, fumaric acid, oleic acid, and the like, and combinations thereof.

Another suitable polyol monomer unit for the polyurethane phase is a polycarbonate polyol or diol having a carbonate moiety (—O—C(O)—O—). These monomer or monomer units can be obtained by reacting suitable diols (propanediol, butanediol, hexanediol, diethylene glycol, triethylene glycol, tetraethylene glycol, and the like, or combinations thereof) with diarylcarbonates, dialkylcarbonate, and the like. Suitable carbonates include alkylene carbonates, dialkyl carbonates, diaryl carbonates, and the like, and combinations thereof. The alkylene carbonates include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Moreover, dialkyl carbonates include dimethyl carbonate, diethyl carbonate, di-n-butyl carbonate, and the like and the diaryl carbonates include diphenyl carbonate. Of these, in view of reactivity and easy availability, the use of ethylene carbonate, dimethyl carbonate, diethyl carbonate, and di-n-butyl carbonate are preferred. Of these, the use of ethylene carbonate is more preferred. Aliphatic and cycloaliphatic polycarbonate polyols can also be used. In one approach, the polyurethane includes about 0 to about 65 wt. %, 10 to 50 wt. %, 20 to 40 wt. %, or 30 to 34 wt. % of the polycarbonate diol by weight of the polyurethane phase.

Ketone-Functionalized Diol Monomer Units: The urethane phase also includes ketone-functionalized diol monomer units, such as monomer units having one or more chain pendant ketone functional groups having reactive activity with hydrazine moieties. In one approach, the ketone-functionalized diol monomer units include mono or poly ketone or mono or poly aldehyde monomer units such as dihydroxyketones (dihydroxy acetone) as well as the Michael-addition product of a ketone-functionalized vinyl amide (such as diacetoneacrylamide) with a diamine or a dialkanol amine (such as diethanol amine and the like). The monomer units may be ketones and aldehydes or the reaction products of the ketones and aldehydes with other reactants (epoxy compounds, polyols, amines, isocyanates). In one approach, the ketone-functionalized diol monomer units are ketone-functionalized dialkanol amidoamine monomer units such as diacetone acrylamide diols. In one approach, the polyurethane includes about 2 to about 20 wt. % of the ketone-functionalized diol monomer units, and in other approaches, 3 to about 8 wt. % or 6 to 8 wt. % preferred by weight of the polyurethane phase.

Optional Urethane Monomer Units: The polyurethane polymer of the urethane phase may also include other monomer units obtained from amines, amides, and the like.

For instance, the urethane phase may also include chain extenders. Diamine and polyamine chain extenders are one example and may include ethylene diamine, 1,6-diaminohexane, 2-methyl-1,5-pentanediamine, 2,2,4-trimethyl-1,6-hexanediamine, 1,12-diamino dodecane, 2-aminoethanol, 2-[(2-aminoethyl)amino]-ethanol, piperazine, 2,5-dimethyl piperazine, 1-amino-3-aminomethyl-3,5,5-trimethyl-cyclohexane, bis-(4-amino cyclohexyl)-methane, bis-(4-amino-3-methyl-cyclohexyl)-methane, 1,4-diamino cyclohexane, 1,2-propylene diamine, hydrazine, urea, amino acid hydrazides, hydrazides of carbazido-carboxylic acids, bis-hydrazides and bis-carbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)ethylene diamine, N-[N-(2-aminoethyl)-2-amino-ethyl]-N'-(2-aminoethyl)-piperazine-, N-(2-aminoethyl)-N'-(2-piperazinoethyl-1)-ethylene diamine, N,N-bis-(2-aminoethyl)-N-(2-piperazinoethyl) amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylene pentamine, tripropylenetetramine, N,N-bis-(6-aminohexyl)amine, N,N'-bis-(3-aminopropyl) ethylene diamine, and 2,4-bis-(4'-aminobenzyl)-aniline, and the like, or mixtures thereof.

The urethane phase may also include water dispersibility monomer units in the polyurethane polymer. If included, these monomer units provide at least one hydrophilic group or a group that can be made hydrophilic by neutralization within the urethane polymer chain. In one approach, carboxylic acid groups can be included in the polymer in an inactive form and activated by a salt-forming compound, such as a tertiary amine. Examples of such monomer units include, but are not limited to, hydroxy-carboxylic acids like dimethylolpropanoic acid (DMPA), dimethylol butanoic acid (DMBA), citric acid, tartaric acid, glycolic acid, lactic acid, malic acid, dihydroxymaleic acid, dihydroxytartaric acid, thioglycolic acid, 2,6-dihydroxybenzoic acid, sulfoisophthalic acid, and the like, and combinations thereof. In other embodiments, sulfonic acid groups can be used in the same fashion as carboxylic acid groups. These may include 3-(2,3-dihydroxypropxy)-1-propane-sulfonic acid and N,N-bis(2-hydroxylalkyl)sulfamic acid (Cl to C6 of alkyl group), and the like, and combinations thereof. Carboxylic acid or sulfonic acid diols may be extended with alkylene oxide.

In some approaches, the polyurethane phase includes about 2.5 to about 4.5 wt. % or about 3 to 4 wt. % of a diamine chain extender and about 5 to about 8 wt. % or 6 to 7 wt. % of a water dispersiblity monomer, each a percentage of the polyurethane phase weight.

Polyurethane Preparation: Aqueous dispersions of polyurethane may be produced by bulk or solution polymerization of the various monomer units. In one approach, the monomer units to form the polyurethane are simply combined in one stage. Alternatively, the monomer units can be charged to the polymerization in various stages as needed to form varying polymeric structures. The monomers for the polyurethane dispersion may be reacted in an aprotic solvent, with the acrylic monomers for the acrylic phase optionally present (the acrylic monomers act as a solvent, not reacting until in a water phase with an azo-initiator added, as discussed below, and after the polyurethane is formed/gone through chain extension). The resulting urethane monomer dispersion is neutralized and dispersed into water. The polyurethane may then undergo chain extension and polymerization by application of the amine-based chain extenders discussed above and via conventional techniques. Some exemplary catalysts include metal or amine catalysts, including dibutyltin dilaurate (DBTDL), 1,4-diazabicyclo (2-, 2-, 2-)octane (DABCO™, available from Evonik), and K-KAT™ bismuth catalysts (product line available from King Industries).

In one approach, the resultant polyurethane polymer includes polyester diol monomer units, polycarbonate diol monomer units, and ketone-functionalized diol monomer units together with the isocyanate monomer units. In other approaches, the polyurethane polymer has a weight ratio of the polycarbonate diol monomer units to the polyester diol monomer units of about 1:20 to about 20:1 and, in other approaches, about 1:5 to about 5:1, about 2:5 to about 4:1, and preferably about 3.2:1. The polyurethane polymer may have a weight average molecular weight (as determined by GPC) of about 5,000 to about 10,000 (preferred 6500) and, in other approaches, about 5,200 to about 8,000 and preferably about 6,500.

Acrylic Phase

The acrylic phase of an optional polyurethane/acrylic hybrid composition includes an acrylic polymer or copolymer and, if included in the composition, forms a hybrid urethane/acrylic system.

Acrylic Monomer Units: As used herein, acrylic polymers or copolymers are prepared from ethylenically unsaturated or vinyl monomers such as one or more of alkyl (meth) acrylate monomer units, vinyl acetate monomer units, styrene monomer units, ketone-functional vinyl monomer units, and the like, or combinations thereof. In some approaches, the acrylic phase has a glass transition temperature of about 0° C. to about 100° C. (in other approaches, about 10° C. to about 90° C., about 20° C. to about 80° C., about 20° C. to about 70° C., or about 20° C. to about 30° C.)

In some approaches, the polymer or copolymer is an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have chain lengths from C1 to C8 and, in some approaches, are ethyl, propyl, isopropyl, butyl, ethyl hexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present invention include any compounds having acrylic functionality. Preferred acrylic monomers are selected from the group consisting of alkyl (meth)acrylates, acrylic acids, as well as aromatic derivatives of (meth)acrylic acid, acrylamides and acrylonitrile. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers in the acrylic phase include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth) acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth) acrylic acid, hydroxyl alkyl (meth)acrylates, such as hydroxyethyl and hydroxypropyl (meth)acrylates, amino (meth)acrylates, as well as acrylic acids such as (meth) acrylic acid, ethacrylic acid, alpha-chloroacrylic acid, alpha-cycanoacrylic acid, crotonic acid, beta-acryloxy propionic acid, and beta-styryl acrylic acid.

In some approaches, the acrylic copolymer includes substantial amounts of a vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of acrylic acid monomer.

Ketone-Functional Vinyl Monomer Units: The acrylic phase may also include ketone-functional vinyl monomer units. In some approaches, these monomer units may be derived from diacetone acrylamide, diacetone (meth)acrylamide, acetoacetoxyethyl (meth)acrylate, acrolein, methacrolein, vinylacetoacetate, crotonaldehyde, 4-vinylbenzaldehyde, vinyl alkyl ketones, acrylamidopivalaldehyde, methacrylamidopivalaldehyde, 3-acryl amidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the acrylic copolymer may include about 0 to about 20 weight percent of the ketone-functional monomer units, and in other approaches, about 0 to about 12 weight percent, and in yet other approaches, about 1 to about 16 weight percent or 2 to about 12 weight percent as a percentage of the acrylic phase.

Other Acrylic Phase Monomers: The acrylic copolymer of the acrylic phase may also include other optional monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application. In some approaches, for instance, the other monomers may each be present in the acrylic copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

Acrylic Polymerization: The above described unsaturated monomers of the acrylic phase can be polymerized by conventional free radical polymerization. The acrylic polymers can be polymerized by one or more free radical initiators including, but not limited to, persulfates, peroxides, and azo compounds, as well as redox combinations. Examples of persulfate initiators include potassium persulfate, sodium persulfate, or ammonium persulfate, and the like, and combinations thereof. The free radical polymerization can be an emulsion, bulk, solution, or dispersion polymerization. Examples of peroxide, azo, redox system, or related initiator systems may include, but not limited to, dicumyl peroxide, cumene hydroperoxide, t-butyl perbenzoate, bis(t-butylperoxy)diisopropyl benzene, diisopropyl benzene hydroperoxide and n-butyl 4,4-bis(t-butylperoxy) valerate, benzoyl peroxide, and t-butyl hydroperoxide, 2,2'-azobis(isobutyronitrile)(AIBN), and the like, and various combinations thereof as applicable for an appropriate process. The polyurethane polymer dispersion may be present but inert in a mixture for the acrylic polymerization.

In some approaches, a chain transfer agent may be present during the acrylic polymerization reaction at a concentration of from about 0.01 to 5 weight percent, or in other approaches, from about 0.1 to 2 weight percent based on the total monomer content of the acrylic phase. Both water-insoluble and water-soluble chain transfer agents can be employed. Illustrative of substantially water-soluble chain transfer agents are alkyl and aryl mercaptans such as butyl mercaptan, mercaptoacetic acid, mercaptoethanol, 3-mercaptol-1,2-propanediol and 2-methyl-2-propanethiol. Illustrative of the substantially water-insoluble chain transfer agents include, for example, t-dodecyl mercaptan, phenyl mercaptan, pentaerythritol tetramercaptopropionate, octyldecyl mercaptan, tetradecyl mercaptan and 2-ethylhexyl-3-mercaptopropionate. Other polymerization conditions, catalysts, and chain transfer agents may be employed as appropriate for a suitable application.

Crosslinking Agent

The urethane or urethane/acrylic hybrid waterborne one-component coating compositions herein include one or more select crosslinking agents effective to achieve the crosslink density in the context of a water based system. In one approach, the crosslinking agent is a hydrazine functionalized crosslinking agent configured to crosslink one or more of the ketone-functionalized diol monomer units, the ketone-functionalized vinyl monomer units, or both. In other approaches, the hydrazine functionalized agent may be a low molecular weight molecule (or oligomer) having one or more hydrazine, hydrazide, or hydrazone groups (—$NHNH_2$). A hydrazide group might be prepared by reacting a polycarboxylic acid with hydrazine. The hydrazine-functionalized crosslinking agent can also be dihydrazides and other polyhydrazides.

The hydrazine-functionalized crosslinking agent reacts with the ketone or carbonyl groups (in either the urethane phase, the acrylic phase, or both) upon an acidic pH. As explained more below, moderation of the reaction using select tertiary amines to help slowly adjust a pH shift from basic to acidic helps aid in achieving the unique coating systems and films herein as the water and amines evaporate. This pH shift and water evaporation promotes the reaction of hydrazine groups in the crosslinking agent with available ketone or aldehyde groups in the urethane phase and/or the acrylic phase providing molecular weight buildup and or crosslinking of the systems herein.

The hydrazine-functionalized crosslinking agent can be prepared from lower molecular weight hydrazine/hydrazide containing compounds or they can be prepared by reacting hydrazine with mono or polycarboxylic acids, ketones, or aldehydes. For example and in one approach, the crosslinking agent may be prepared by reacting two moles of hydrazine with one mole of adipic acid to form adipic dihydrazide. In other approaches, the hydrazine-functionalized crosslinking agent can be prepared by polymerizing vinyl containing monomers and then functionalizing formed oligomers or polymers with an acid, ketone, or aldehyde groups with hydrazine.

In some approaches, examples of dihydrazides for the systems and coating compositions herein include, but are not limited to, adipic dihydrazine, oxalic acid dihydrazide, malonic acid dihydrazide, succinic acid dihydrazide, glutaric acid dihydrazide, adipic acid dihydrazide cyclohexane dicarboxylic acid bis-hydrazide, azelaic acid bis-hydrazide, and sebacic acid dihydrazide.

The compositions herein may include about 0.25:1 to 1.5:1 moles dihydrazide crosslinking agent to moles ketone diol, in other embodiments 0.7:1 to 1.3:1, and in a preferred embodiment 0.75:1.

Reaction Moderators

The waterborne one-component coating compositions herein include select reaction moderators in the form of one or more select tertiary amine reaction moderators having a high boiling point, high azeotrope temperature, and/or certain amine contents thereof effective to help moderate the rate, timing, and amount of crosslinking.

The term "reaction moderator(s)" or "neutralizing agent (s)" as used herein is meant to indicate that in some manner, the compound(s) allow(s) for moderating or retarding the crosslinking process that occurs in the aqueous phase prior to film formation, thus forming a more uniform film during the water evaporation. The reaction moderator can also act as a catalyst to "catalyze" the post film formation crosslinking reaction after the water has evaporated, thus forming a highly crosslinked coating. While the inventors do not wish to be bound by the theoretical basis for good results achievable with the use of the present invention, it is believed that the reaction moderators inhibit reaction in the wet coating by forming complexes with the reactants. As the coating dries thoroughly, the catalytic activities are manifested to produce higher crosslink densities. The net result is a more controlled crosslinking reaction and a coating having higher crosslink density and more uniform film formation, and thus, better overall coating performance.

In one approach, suitable reaction moderators include certain tertiary amines having either an azeotrope temperature or boiling point above the azeotrope temperature of triethylamine and water (azeotrope, approximately 76° C.) or above the boiling point of triethylamine (boiling point, approximately 88° C.), respectively. In some approaches, the azeotrope temperature or boiling point of the reaction moderators is about 77 to about 130° C., and in other approaches, about 80 to about 110° C. Such tertiary amines having these characteristics help slow down the evaporation rate of amines, extend the open time, delay the pH change rate from basic to neutral or acidic, and control amount of crosslinking to form suitable crosslink densities at certain time to prevent cracking due to premature crosslinking (crosslink happens too fast before the film is well formed) in the context of a one-component waterborne systems herein. In this disclosure, reference to the boiling point as a selection criterion for a reaction moderator shall apply only where the reaction moderator will not form an azeotrope with water or buffer solution, i.e., the reaction moderator has no azeotrope temperature to reference.

In one approach, the one or more tertiary amine reaction moderators may be an alkoxydialkylamine. In other approaches, the one or more tertiary amine reaction moderators may have a structure of Formula I below

(Formula I)

wherein R1 and R2 may independently be a C1 to C4 alkyl group or, in other approaches, R1 is the same as R2. R3 may be a C3 to C10 hydroxyalky group and, in some approaches, a hydroxyl propyl group. The R1, R2, and R3 groups may substituted with one or more functional groups such as hydroxyl, halogen, alkoxy and/or one or more carbon atoms may be replaced by heteroatoms such as oxygen or sulfur as needed for particular applications.

In other approaches, the one or more tertiary amine reaction moderators are selected from the group consisting of dimethyl amino hydroxyl propane ("DMAHP," available in 77% aqueous solution as Bisomer® Amine D700 from GEO Specialty Chemicals, Southampton, UK), dimethylamino-2-methyl-1-proponal ("DMAMP"), N—N-dimethyl-3-methoxypropylamine, dimethylaminoethanol and combinations thereof.

The compositions herein, in some approaches, may include about 1 to about 4 wt. % of the tertiary amine reaction moderator, and in other approaches, about 1.5 to about 3.5 wt. % of the reaction moderator, and in a further embodiment, 1.8 to 3 wt. % of the reaction moderator, as a percentage of the polyurethane or polyurethane/acrylic hybrid polymer dispersion.

Waterborne Compositions

In one approach, the waterborne compositions herein include only the above-described urethane phase having the urethane polymer. In other approaches, the compositions herein include hybrid systems with both the above-described urethane phase and corresponding urethane polymer and the above-described acrylic phase with the corresponding acrylic polymer. In such instance of a hybrid system, the waterborne compositions herein include about 10 to about 90 wt. % of the urethane phase and about 90 to about 10 wt. % of the acrylic phase as a percentage of the hybrid system. In other approaches, a hybrid system may include a weight ratio of the acrylic phase to the urethane phase of about 1:9 to about 9:1, 3:9 to 9:3, or 1:2 to 2:1. In yet other approaches or instances, a hybrid system as described herein may further include a weight ratio of the ketone-functionalized diol monomer units (in the urethane phase) to the ketone-functional vinyl monomer units (in the acrylic phase) of about 1:1 to about 2:1, in other approaches, about 1:1.

Crosslinking between the dihydrazide and the ketone groups typically occurs at a pH below 7. Thus, the compositions herein with the select reaction moderators maintain the pH above 7 to hinder crosslinking. Upon application to a surface and evaporation of the water and tertiary amine reaction moderator, crosslinking between the dihydrazide and ketone groups (either in the urethane phase or the acrylic phase) occurs when sufficient water and reaction moderator have evaporated so that the pH shifts below 7 to promote crosslinking. The reaction moderators selected herein are unique because they delay the onset of crosslinking via a slow evaporation due to their boiling point, azeotrope temperature, and/or amine content thereof. This slow evaporation results in better film formation properties, high crosslink density, high chemical resistance and/or better gloss in the context of the waterborne compositions herein.

In some instances, the waterborne compositions herein may be blended with various kinds of additives which are suitable for paint and other coatings appropriate for the desired application or end use. Examples of such additives include pigments, surfactants, defoamers, biocides, mildewcides, algaecides, thickeners, anti-settling agents, pH buffers, corrosion inhibitors, driers, and/or anti-skinning agents.

The waterborne coating compositions herein, when dried as a film, may exhibit a Koenig hardness of about 30 to about 120, a gloss of about 60 to about 90 measured at 85°, and/or a good chemical resistance of about 25 to about 30 as measured by ASTM D1308-02 (2013) and further described herein.

Pigments

The waterborne compositions of the present disclosure may also include optional pigments or inorganic particles. If included, suitable pigment particles or inorganic particles used in the polymer compositions or complexes or the water-borne paint composition of the present disclosure may be titanium dioxide (TiO2), zinc oxide (ZnO2), calcium carbonate (CaCO3), talc, clay materials, aluminum oxide, silicon dioxide, magnesium oxide, zinc sulfate, sodium oxide, potassium oxide, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica (SiO2). Generally, titanium dioxide has a particle size of from about 0.2 to about 0.3 microns in diameter and is provided in powder form, or in an aqueous slurry. An example of a titanium dioxide that is suitable for use in the present invention is Ti-Pure® R-706, which is commercially available from E.I. du Pont de Nemours and Company. Ti-Pure® R-706 titanium dioxide is a rutile titanium dioxide that is surface treated with silica.

Glossary of Terms

Additives refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

Glass Transition Temperature or Tg generally refers to a temperature region where an amorphous polymer transitions from a hard, glassy material to a softer, rubbery material. Typically, this transition is reversible. Tg is measured by differential scanning calorimetry (DSC) and/or dynamic mechanical analysis (DMA), such as with a TA Instruments Q200 differential scanning calorimeter or the like instrument. Preferably, Tg is measured through DSC.

Volatile Organic Compound or VOC generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

As used herein, without the need for, without substantial levels of, in the absence of, or substantially free of, or free-of generally means the coating compositions herein have less than about 1 weight percent, in other approaches, less than about 0.5 weight percent, in other approaches, less than about 0.2 weight percent, and in yet other approaches, none of the particular component or additive.

When referring to a polymer, oligomer, or copolymer, and a particular monomer is described, it is also intended that such discussion refers to the monomer unit or associated repeating unit when polymerized within the polymer, oligomer, or copolymer. Likewise, when a monomer unit or repeating unit of a polymer, oligomer, or copolymer is described, the corresponding monomer is also contemplated by this disclosure.

As used herein, (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

As used herein, functionalized, functionality, or functional group means a group or moiety of a larger molecule or polymer reactive with another group or atom.

Chemical resistance as measured herein is determined through ASTM D1308-02 (2013) relating to the chemical resistance of finishes. Chemical resistance tests performed herein were accomplished by following ASTM D1308-02 (2013) and reporting a rating for each substance tested on a scale of 1 to 5. The following six substances were used for each coating tested: Organic solvents—(1) ethanol, (2) Brake fluid, (3) methyl ethyl ketone ("MEK"); Base—(4) 25% aqueous sodium hydroxide (NaOH); Acids—(5) 10% aqueous acetic acid, and (6) 30% aqueous hydrochloric acid (HCl). The following rating scale was used to assign a rating 1 to 5 based on appearance of a coating applied to a substrate after exposure to a particular chemical, 1 indicating the worst performance and 5 the best:

1—substrate visible
2—severe color change, rust, blistering, delamination, very soft
3—slight to moderate blistering, delamination and/or wrinkling, loss of gloss, color change, or slightly soft
4—very slight change in color and gloss at close inspection but seemingly no change at arm's length
5—no apparent change in color and gloss, no change in film appearance at close inspection As described herein, a coating was ascribed a "good" chemical resistance rating where the sum of the test scores totaled 25 to 30.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. McNutt and H. L. Ramsay in American Paint and Coatings Journal, April, 1988, p. 46 by the weight drawdown method, which is incorporated herein by reference.

Sheen may also sometimes be referred to as gloss. In a coating, a gloss finish indicates that the surface which has a coating applied to it (i.e., is finished) it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss which is measured at 60° relative to the surface reflecting the light. One of skill in the art is able to determine relative levels of gloss (low versus high) in context of each coating.

Paint or coating refers to any mixture or composition including different types of raw materials, each with its own function, which must be balanced to achieve the desired properties in the final product or film coating. The two functions of paint or coating are decoration and/or protection. A paint or coating may contain a solvent (which can include a volatile component derived from a petroleum distillate for a solvent-based paint, or a low VOC, or no-VOC, or water for a water-based paint or composition), a binder polymer, a pigment, fillers (such as an extender or a plurality of extenders of different sizes) and an additive, which may impart different functionality to the paint or final coating.

Coatings refer to compositions such as paint, stains, lacquers, etc.

Gloss refers to the gloss intensity measured at 20, 60, or 85 degrees and is determined according to ASTM D323.

Pigment volume concentration or PVC refers to a number that represents the volume of pigment compared to the volume of all solids. In the field of paints and coatings, PVC is a useful measure because the binder (non-pigment) acts as the material to unite all the pigment and other raw materials into the paint and the PVC value ensures there is enough binder to enable the paint to adhere properly to whatever it has been applied over in addition to containing all of the other components of the paint. If a paint has no pigment at all it will usually be very glossy and have a PVC of zero. An example is clear gloss paints. Flat paints have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin and low sheen paints. Gloss colored paints can vary from 3% to about 20% PVC depending on the color of the paint. Generally, the darker the color of the gloss paint the lower the PVC. Additionally, it is thought that the lower the PVC of a paint is, the better its mechanical properties (such as tensile strength, and consequently, exterior durability) will be. PVC may be expressed as a percentage. For example, if a coating has a PVC of 30, then 30% of the total binder/pigment blend is pigment, and 70% is binder solids on a volume basis.

Critical pigment volume concentration or CPVC is the point at which there is just enough binder to wet (entirely surround) the pigment particles. As PVC reaches and then increases above CPVC, mechanical properties of the paint deteriorate. Above CPVC, with insufficient binder to satisfy pigment surface and fill interstitial spaces, air is introduced into the film resulting in a decrease in film integrity. However, above CPVC, increased air and pigment interface results in a substantial boost in pigment scattering efficiency. A film below the CPVC has excess resin and may exhibit a smooth surface that reflects light or appears to be glossy. As the PVC of a film approaches CPVC, the film will appear to be flatter, although the aforementioned loss of mechanical properties may become a limiting factor in how close to CPVC a paint producer wishes to provide the PVC.

Burnish refers to the ability of a coating to retain its gloss value after being subjected to mechanical forces, such as abrasion. Burnish may be measured through ASTM D6736-08.

Refractive Index refers to a measurement that describes how light propagates through a material or medium. If needed, refractive index may be measured through one or more of ASTM D1218, D1747, or D542.

Certain terminology is used herein for convenience only and is not to be taken as a limitation on the present disclosure.

EXAMPLES

The following examples demonstrate the preparation of copolymers and waterborne compositions such as those described herein above, as well as non-inventive examples for comparison. The examples are intended to be representative of the polymers that can be made and are not intended to limit the scope of the present disclosure to the specific illustrative examples disclosed below. All percentages, ratios, and amounts in this disclosure and the Examples are by weight unless otherwise specified.

Examples 1-9

TABLE 1

Non-inventive Examples 1-9 Compositions and Characterization

Polyurethane/Acrylic Hybrid Polymer

| Chemical Name | Function | #1 | #2 | #3 | #4 | #5 | #6 | #7 | #8 | #9 |
|---|---|---|---|---|---|---|---|---|---|---|
| N-Methyl-2-pyrrolidone | Solvent | 106.0 | 106.0 | 106.0 | 106.0 | 106.0 | 106 | 106 | 106 | 106 |
| Methylene bis (4-cyclohexylisocyanate) | Diisocyanate | 180.8 | 250.0 | 180.8 | 250.0 | 180.8 | 250.0 | 180.8 | 250.0 | 215.5 |
| Duranol T4671 (from Asahi Kasei) | Polycarbonate diol monomer | 146.1 | 146.1 | 146.1 | 146.1 | 146.1 | 146.1 | 146.1 | 146.1 | 146.1 |
| Piothane 70-3000 (from Specialty Resins) | Polyester diol monomer | 44.3 | 44.3 | 44.3 | 44.3 | 44.3 | 44.3 | 44.3 | 44.3 | 44.3 |
| Diacetone Acrylamide Diol | Ketone Functional diol monomer | 0.0 | 69.0 | 0.0 | 69.0 | 0.0 | 69.0 | 0.0 | 69.00 | 34.50 |
| Dibutyl Tin Dilaurate (DBTDL) | Catalyst | 0.01 | 0.01 | 0.01 | 0.01 | 0.01 | 0.01 | 0.01 | 0.01 | 0.01 |
| Dimethylol propionic acid | Water dispersibility monomer | 28.6 | 28.6 | 28.6 | 28.6 | 28.6 | 28.6 | 28.6 | 28.6 | 28.6 |
| Methyl Methacrylate | Methacrylic monomer | 157.8 | 157.8 | 215.5 | 215.5 | 157.8 | 157.8 | 215.5 | 215.5 | 188.2 |
| 2-EthylHexylAcrylate | Acrylic monomer | 162.2 | 162.2 | 104.4 | 104.4 | 162.2 | 162.2 | 104.4 | 104.4 | 131.8 |
| DiacetoneAcrylamide | Ketone Functional acrylic monomer | 0.0 | 0.0 | 0.0 | 0.0 | 34.5 | 34.5 | 34.5 | 34.5 | 17.3 |
| Triethylamine | Tertiary Amine (Non-Inventive) | 21.7 | 21.7 | 21.7 | 21.7 | 21.7 | 21.7 | 21.7 | 21.7 | 21.7 |
| Deionized Water | Solvent | 933.3 | 1089.2 | 933.3 | 1089.2 | 933.3 | 1051.6 | 933.3 | 1266.9 | 980.3 |
| 2,2'-Azo bis(2-methylbutyronitrile) | Initiator | 2.0 | 2.0 | 2.0 | 2.0 | 2.0 | 2.0 | 2.0 | 2.0 | 2.0 |
| N-Methyl-2-pyrrolidone | Solvent | 10.0 | 10.0 | 10.0 | 10.0 | 10.0 | 10.0 | 10.0 | 10.0 | 10.0 |
| Deionized Water | Solvent | 95.0 | 95.0 | 95.0 | 95.0 | 95.0 | 95.0 | 95.0 | 95.0 | 95.0 |
| Ethylenediamine | Chain Extender | 18.9 | 16.0 | 18.9 | 16.0 | 18.9 | 16 | 18.9 | 16.0 | 17.3 |
| Adipic Dihydrazide | Hydrazine Functional Crosslinking Agent | 0.0 | 20.8 | 0.0 | 20.8 | 17.8 | 38.6 | 17.8 | 38.6 | 19.3 |
| Polymer Test Results | | | | | | | | | | |
| Tg of Acrylic ° C. (calculated) | | 0 | 0 | 30 | 30 | 0 | 0 | 30 | 30 | 15 |
| PC/PE ratio (calculated) | | 3.2:1 | 3.2:1 | 3.2:1 | 3.2:1 | 3.2:1 | 3.2:1 | 3.2:1 | 3.2:1 | 3.2:1 |
| % solids (NVM) | | 40.9 | 38.6 | 42.5 | 41.1 | 38.0 | 42.8 | 41.0 | 42.5 | 44.0 |
| PH | | 7.8 | 8.6 | 8.1 | 7.2 | 8.8 | 8.2 | 9.4 | 8.1 | 8.2 |
| Particle Size -nm (Malvern) | | 57.1 | 48.9 | 54.6 | 57.7 | 63.0 | 55.4 | 72.2 | 50,5 | 47.9 |

Comparative, non-inventive polyurethane/acrylic hybrids in Non-inventive Examples 1-9 were prepared via 3 main steps: Polyurethane Reaction, Dispersion, and Acrylic Polymerization, described below.

Polyurethane Reaction

1. Heat the polycarbonate diol monomer in oven at 100° C. for 1 hour, and the polyester diol monomer in oven at 60° C. and pour both into reactor. Charge the polycarbonate diol monomer, and polyester diol monomer to the reactor.
2. Charge ketone functional diol monomer and solvent to reactor under N2.
3. Add Diisocyanate and catalyst and heat to 50° C. Expect exotherm at 50° C.
4. Allow temperature to drift to 80° C. over 15 minutes then hold at 80° C. for 45 minutes. Check isocyanate level.
5. Hold until isocyanate level is at targeted amount.
6. Add water dispersibility monomer and maintain temperature at 80° C. Check isocyanate level after 1.5 hour and then every 30 minutes until isocyanate level is at targeted amount.
7. Cool reactor to 70° C. and then add the acrylic monomers and mix for 15 minutes. Pull Sample for Viscosity, NVM, and Molecular Weight. Check isocyanate level and solids.
8. Cool to <40° C., add reaction moderator and mix 15 minutes before dispersing the prepared urethane polymer (polyurethane dispersion or PUD).

Dispersion

1. In separate letdown tank, add cold DI water and begin mixing.
2. In two separate containers, mix chain extender with DI water and initiator with solvent.
3. Weigh the flask set-up, then pour the PUD into the water over 10 minutes with agitation, calculate transfer efficiency after complete.
4. Multiply chain extender solution amount by transfer efficiency to obtain addition amount. Slowly add the EDA solution while keeping the temperature below 20° C.
5. Hold for 15 minutes.

Acrylation

1. Start increasing temperature to 52° C. (expect exotherm at 52° C.). Allow temperature to drift to 65° C.
2. Hold for 4.0 hours at 65° C.
3. After hold start cooling reactor.
4. Blend hydrazine functional crosslinking agent and water and heat to solubilize. And solution to reactor.
5. Mix for 15 minutes and continue cooling to <40° C.
6. Filter through 250 μm bag.

Chemical resistance testing, as described in this application with Non-inventive Example paint films curing at room temperature, was performed from films formed of Non-inventive Examples 1-8 and reported below in Tables 2 and 3. The data in TABLE 2 indicate that the addition of the ketone functional diol into the polyurethane backbone increases the chemical resistance to organic solvents as shown in Non-inventive Examples 2 and 6 in the polyurethane/acrylic hybrids with a Tg of 0° C. At 30° C. Tg, improvements were observed in base resistance with DAAM diol and in acid resistance with DAAM in the acrylic phase.

TABLE 2

Non-inventive Examples 1, 2, 5, and 6 - 0° C. Tg Chemical Resistance Testing

| Tg = 0° C. | #1 | #2 | #5 | #6 |
| --- | --- | --- | --- | --- |
| DAAM diol | 0 | 8 | 0 | 8 |
| DAAM | 0 | 0 | 4 | 4 |
| Tg | 0° C. | 0° C. | 0° C. | 0° C. |
| Organic Solvents | | | | |
| Ethanol | 3 | 5 | 1 | 4 |
| Brake fluid | 1 | 5 | 1 | 4 |
| MEK | 3 | 5 | 3 | 4 |
| Base | | | | |
| 25% NaOH | 5 | 4 | 4 | 5 |
| Acids | | | | |
| 10% Acetic acid | 4 | 2 | 3 | 2 |
| 30% HCl | 5 | 3 | 1 | 1 |
| TOTAL | 21 | 24 | 13 | 20 |

TABLE 3

Non-inventive Examples 3, 4, 7, and 8 - 30° C. Tg Chemical Resistance Testing

| Tg = 30° C. | #3 | #4 | #7 | #8 |
| --- | --- | --- | --- | --- |
| DAAM diol | 0 | 8 | 0 | 8 |
| DAAM | 0 | 0 | 4 | 4 |
| Tg | 30° C. | 30° C. | 30° C. | 30° C. |
| Organic Solvents | | | | |
| ethanol | 5 | 5 | 5 | 5 |
| Brake fluid | 5 | 5 | 1 | 5 |
| MEK | 5 | 5 | 5 | 5 |
| Base | | | | |
| 25% NaOH | 4 | 5 | 5 | 5 |
| Acids | | | | |
| 10% acetic acid | 2 | 3 | 5 | 3 |
| 30% HCl | 3 | 3 | 3 | 3 |
| TOTAL | 24 | 26 | 24 | 26 |

Non-inventive Examples 3, 4, 7, and 8, however, showed poor film formation, as evidenced by lower gloss.

A tertiary amine reaction moderator (Bisomer D700—"DMAHP") was post added to Non-inventive Examples 4, 8, and 9 (compositions with higher Tg=30° C.) to form corresponding Inventive Examples 14, 18, and 19, wherein DMAHP replaced triethylamine in equivalent weights. The results on gloss are shown below in TABLE 4, on hardness and impact resistance in TABLE 5, and on chemical resistance in TABLE 6.

TABLE 4

Gloss - Inventive Examples I4, I8, and I9 and Corresponding Non-Inventive Examples - 30° C. Tg

| | Gloss Value | | |
| --- | --- | --- | --- |
| Gloss Measured at: | 20° | 60° | 85° |
| #4 (Non-inventive) | 36 | 70 | 70 |
| I4 (Inventive) | 79 | 89 | 98 |
| #8 (Non-inventive) | 12 | 46 | 45 |
| I8 (Inventive) | 72 | 87 | 97 |

TABLE 4-continued

Gloss - Inventive Examples I4, I8, and I9 and Corresponding Non-Inventive Examples - 30° C. Tg

| Gloss Measured at: | 20° | 60° | 85° |
|---|---|---|---|
| #9 (Non-inventive) | 60 | 82 | 89 |
| I9 (Inventive) | 77 | 88 | 98 |

TABLE 5

Hardness and Impact Resistance - Inventive Examples I4, I8, and I9 and Corresponding Non-Inventive Examples - 30° C. Tg

| | Koenig Hardness Room Temp. Cure | Bake Cure | Impact (Air Dry) Direct (in. lb.) | Inverse (in. lb.) | Impact (Baked) Direct (in. lb.) | Inverse (in. lb.) |
|---|---|---|---|---|---|---|
| E4 | 79 | 83 | 160 | 160 | 160 | 160 |
| E4 + DMAHP | 88 | 100 | 160 | 160 | 160 | 160 |
| E8 | 78 | 73 | 160 | 60 | 160 | 120 |
| E8 + DMAHP | 86 | 92 | 160 | <40 | 160 | 80 |
| E9 | 75 | 80 | 160 | 140 | 160 | 160 |
| E9 + DMAHP | 73 | 78 | 160 | 160 | 160 | 160 |

TABLE 6

Chemical Resistance - Inventive Examples I4, I8, and I9 and Corresponding Non-Inventive Examples - 30° C. Tg 1-Day Exposure Chemical Resistance Ratings - Room Temperature Cure

| | 10% Acetic | Conc. HCl | Brake Fluid | EtOH | MEK | 25% NaOH | Total Chem Rating | Organic Rating | Aqueous Rating | Acid Rating |
|---|---|---|---|---|---|---|---|---|---|---|
| E4 | 3 | 3 | 5 | 5 | 5 | 5 | 26 | 15 | 11 | 6 |
| E4 + DMAHP | 3 | 3 | 5 | 5 | 5 | 5 | 26 | 15 | 11 | 6 |
| E8 | 3 | 3 | 5 | 5 | 5 | 5 | 25 | 15 | 10 | 6 |
| E8 + DMAHP | 3 | 3 | 5 | 5 | 5 | 5 | 26 | 15 | 11 | 6 |
| E9 | 3 | 3 | 5 | 5 | 5 | 4 | 25 | 15 | 10 | 6 |
| E9 + DMAHP | 3 | 3 | 5 | 4 | 5 | 4 | 24 | 14 | 10 | 6 |

1-Day Exposure Chemical Resistance Ratings - Bake Cure

| | 10% Acetic | Conc. HCl | Brake Fluid | EtOH | MEK | 25% NaOH | Total Chem Rating | Organic Rating | Aqueous Rating | Acid Rating |
|---|---|---|---|---|---|---|---|---|---|---|
| E4 | 3 | 3 | 5 | 5 | 5 | 5 | 26 | 15 | 11 | 6 |
| E4 + DMAHP | 3 | 3 | 5 | 5 | 5 | 5 | 26 | 15 | 11 | 6 |
| E8 | 3 | 3 | 5 | 5 | 5 | 5 | 26 | 15 | 11 | 6 |
| E8 + DMAHP | 3 | 3 | 5 | 5 | 5 | 5 | 26 | 15 | 11 | 6 |
| E9 | 5 | 3 | 4 | 5 | 5 | 4 | 26 | 14 | 12 | 8 |
| E9 + DMAHP | 5 | 3 | 4 | 4 | 5 | 4 | 25 | 13 | 12 | 8 |

Examples 10-12

Three additional, Non-Inventive Example polymers were prepared following the same process as in examples 1-9, but according to compositions described below in TABLE 7.

TABLE 7

Non-inventive Examples 10-12 Compositions and Characterization
Polyurethane/Acrylic Hybrid Polymer

| Chemical Name | Function | #10 | #11 | #12 |
|---|---|---|---|---|
| N-Methyl-2-pyrrolidone | Solvent | 32.0 | 32.0 | 32.0 |
| Methylene bis (4-cyclohexylisocyanate) | Diisocyanate | 157.2 | 146.5 | 140.2 |
| Duranol T4671 (from Asahi Kasei) | Polycarbonate diol monomer | 93.5 | 93.5 | 93.5 |
| Piothane 70-3000 (from Specialty Resins) | Polyester diol monomer | 28.4 | 28.4 | 28.5 |
| DiacetoneAcrylamideDiol | Ketone Functional diol monomer | 44.8 | 22.4 | 11.4 |
| Dibutyl Tin Dilaurate (DBTDL) | Catalyst | 0.01 | 0.01 | 0.01 |
| Dimethylol propionic acid | Water dispersibility monomer | 18.3 | 18.3 | 18.3 |
| Methyl Methacrylate | Methacrylic monomer | 244.9 | 234.5 | 229.4 |
| 2-EthylHexylAcrylate | Acrylic monomer | 125.2 | 117.5 | 112.6 |
| DiacetoneAcrylamide | Ketone Functional acrylic monomer | 22.4 | 11.2 | 5.5 |
| Triethylamine | Tertiary Amine (Non-inventive) | 13.8 | 13.8 | 13.8 |
| Deionized Water | Solvent | 944.5 | 894.5 | 869.5 |
| 2,2'-Azo bis (2-methylbutyronitrile) | Initiator | 1.8 | 1.8 | 1.8 |
| N-Methyl-2-pyrrolidone | Solvent | 6.4 | 6.4 | 6.4 |
| Deionized Water | Solvent | 48.0 | 48.0 | 48.0 |
| Ethylenediamine | Chain Extender | 10.4 | 10.4 | 10.4 |
| Adipic Dihydrazide | Hydrazine Functional Crosslinking Agent | 20.2 | 10.1 | 5.0 |
| Polymer Test Results | | | | |
| Tg of Acrylic oC (calculated) | | 30 | 30 | 30 |
| PC/PE ratio (calculated) | | 3.3:1 | 3.3:1 | 3.3:1 |
| % solids (NVM) | | 42.0 | 41.8 | 41.7 |
| PH | | 8.2 | 8.6 | 8.1 |

The polymers of Non-Inventive Examples 10-12 were also formulated with DMAMP in place of triethylamine to form corresponding Inventive Examples I10, I11, and I12. DMAMP was post added to the polymers in Inventive Examples I10, I11, and I12. The amount used was the same as triethylamine. At high levels of the ketone functional monomer, the DMAMP promotes better film formation as shown by higher gloss readings and clearer films below in TABLE 8. Clarity is assessed by visual assessment of cured films. Determination of what constitutes a high level of ketone functional monomer depends in part on the Tg of the underlying polymer or hybrid polymer. Generally, higher Tg systems may more difficulty in film formation. Thus, higher Tg systems may tolerate lower amounts of ketone functional monomer in achieving proper film formation and require tertiary amine reaction moderator.

TABLE 8

Gloss and clarity - Inventive Examples I10, I11, and I12 and Corresponding Non-Inventive Examples

| | total DAAM level % | % DAAM diol in PUD | % DAAM in acrylic | 60° gloss w/o DMAMP | 60° gloss w/ DMAMP |
|---|---|---|---|---|---|
| Example 10 | 12 high | 8 | 4 | 68.3 cloudy appearance | 85.9 clear |
| Example 11 | 6 medium | 4 | 2 | 86.6 clear | 86.8 clear |
| Example 12 | 3 low | 2 | 1 | 86.5 clear | 86.7 clear |

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A waterborne one-component coating composition capable of self-crosslinking and exhibiting a gloss and hardness when cured that is similar to a solventborne two-component composition, the composition comprising:
   a first, urethane phase including a polyurethane polymer with at least one of polyester diol monomer units, polycarbonate diol monomer units, and ketone-functionalized diol monomer units;
   a second phase including polymer having monomer units selected from one of alkyl (meth)acrylate monomer units, vinyl acetate monomer units, styrene monomer units, ketone-functional vinyl monomer units, or combinations thereof, the second phase having a glass transition temperature of about 0° C. to about 100° C.;
   a hydrazine-functionalized crosslinking agent configured to crosslink the ketone-functionalized diol monomer units or the ketone-functionalized diol monomer units and the ketone-functional vinyl monomer units; and
   one or more reaction moderators,
   wherein the urethane phase comprises about 1 to 10 weight percent of the ketone-functionalized diol monomer units based on the weight of the urethane phase;
   wherein the one or more reaction moderators are present in the coating composition at 1 to 4 weight percent based on the combined weight of the first and second phases; and
   wherein the one or more reaction moderators are selected from the group consisting of dimethyl amino hydroxyl propane, dimethylamino-2-methyl-1-proponol, N—N-dimethyl-3-methoxypropylamine, dimethylaminoethanol and combinations thereof.

2. The waterborne one-component coating composition of claim 1, wherein the weight ratio of the ketone-functionalized diol monomer units to the ketone-functional vinyl monomer units is about 1:1 to about 2:1.

3. The waterborne one-component coating composition of claim 1, wherein the weight ratio of the second phase to the first phase is about 1:9 to about 9:1.

4. The waterborne one-component coating composition of claim 1, wherein the composition includes about 3 to about 8 percent of the ketone-functionalized diol monomer units based on the weight of the urethane phase.

5. The waterborne one-component coating composition of claim 1, wherein the ketone-functionalized diol monomer units in the urethane phase are ketone-functionalized dialkanol amidoamine monomer units.

6. The waterborne one-component coating composition of claim 1, wherein the ketone-functionalized diol monomer units in the urethane phase are obtained from the Michael reaction between a dialkanol amine and a ketone-functionalized vinyl amide.

7. The waterborne one-component coating composition of claim 1, wherein the ketone-functionalized diol monomer units include a diacetone acrylamide functionality, a silane functionality, a fluoro functionality, or combinations thereof.

8. The waterborne one-component coating composition of claim 1, wherein the second phase includes the alkyl (meth)acrylate monomer units; and wherein the alkyl (meth)acrylate monomer units are selected from the group consisting of methyl (meth)acrylate units, ethylhexyl (meth)acrylate units, cyclohexyl (meth)acrylate units, decyl (meth)acrylate units, isodecyl (meth)acrylate units, benzyl (meth)acrylate units, isobornyl (meth)acrylate units, neopentyl (meth)acrylate units, 1-adamantyl (meth)acrylate units, and combinations thereof and wherein the ketone-functional vinyl monomer units are selected from the group consisting of diacetone acrylamide units, diacetone (meth)acrylamide units, acetoacetoxyethyl (meth)acrylate units, acrolein units, methacrolein units, vinylacetoacetate units, and combinations thereof.

9. The waterborne one-component coating composition of claim 8, wherein the second phase includes an acrylic polymer having about 100 to about 94 percent of linear or branched alkyl (meth)acrylate monomer units and about 0 to about 6 percent of the ketone-functional vinyl monomer units.

10. The waterborne one-component coating composition of claim 1, wherein the weight ratio of the ketone-functionalized diol monomer units to the ketone-functional vinyl monomer units is about 1:1.

11. The waterborne one-component coating composition of claim 1, wherein the coating composition, when dried as a film, exhibits a Koenig hardness of about 30 to about 120.

12. The waterborne one-component coating composition of claim 1, wherein the coating composition, when dried as a film, exhibits a gloss of about 60 to about 90 measured at 85°.

13. The waterborne one-component coating composition of claim 1, wherein the coating composition, when dried as a film, is tested for chemical resistance of each of (1) ethanol, (2) brake fluid, (3) methyl ethyl ketone, (4) 25% aqueous sodium hydroxide, (5) 10% aqueous acetic acid, and (6) 30% aqueous hydrochloric acid according to ASTM 01308-02 (2013); and wherein each test is graded on a scale of:
  1—substrate visible
  2—severe color change, rust, blistering, delamination, very soft
  3—slight to moderate blistering, delamination and/or wrinkling, loss of gloss, color change, or slightly soft
  4—very slight change in color and gloss at close inspection but seemingly no change at arm's length
  5—no apparent change in color and gloss, no change in film appearance at close inspection; and
  wherein the chemical resistance of each test is added to yield a total chemical resistance score, and wherein the coating composition exhibits a total chemical resistance score of 25 to 30.

14. The waterborne one-component coating composition of claim 1, wherein the polyurethane polymer of the urethane phase includes a weight ratio of the polycarbonate diol monomer units to the polyester diol monomer units of about 3:1 to about 20:1.

15. A method of delaying the onset of crosslinking in a waterborne one-component coating composition capable of self-crosslinking at room temperature, the method comprising:
  (a) applying a one-component coating composition to a substrate, the one-component coating composition including
    a first, urethane phase including a polyurethane polymer with at least one of polyester diol monomer units, polycarbonate diol monomer units, and ketone-functionalized diol monomer units;
    a second phase including polymer having monomer units selected from one of alkyl (meth)acrylate monomer units, vinyl acetate monomer units, styrene monomer units, ketone-functional vinyl monomer units, or combinations thereof, the second phase having a glass transition temperature of about 0° C. to about 100° C., wherein the urethane phase comprises about 1 to 10 weight percent of the ketone-functionalized diol monomer units based on the weight of the urethane phase;
    a hydrazine-functionalized crosslinking agent configured to crosslink the ketone-functionalized diol monomer units or the ketone-functionalized diol monomer units and the ketone-functional vinyl monomer units; and
    one or more reaction moderators, wherein the one or more reaction moderators are present in the coating composition at 1 to 4 weight percent based on the combined weight of the first and second phases; and
    wherein the one or more reaction moderators are selected from the group consisting of dimethyl amino hydroxyl propane, dimethylamino-2-methyl-1-proponol, N—N-dimethyl-3-methoxypropylamine, dimethylaminoethanol and combinations thereof; and
  (b) evaporating the one or more reaction moderators from the applied coating composition at about 20 to about 25° C. to lower the pH thereof below about 7 to initiate imine bond formation between the ketone-functionalized diol monomer units or the ketone-functionalized diol monomer units and the ketone-functional vinyl monomer units and the hydrazine-functionalized crosslinking agent.

16. The method of claim 15, wherein the weight ratio of the ketone-functionalized diol monomer units to the ketone-functional vinyl monomer units is about 1:1 to about 2:1.

\* \* \* \* \*